(12) United States Patent
Madala

(10) Patent No.: US 9,622,462 B2
(45) Date of Patent: Apr. 18, 2017

(54) FISHING LURE WITH PLURAL FLOW-THROUGH APPENDAGE CAVITY PORTIONS

(71) Applicant: William G. Madala, Racine, WI (US)

(72) Inventor: William G. Madala, Racine, WI (US)

(*) Notice: Subject to any disclaimer, the term of this patent is extended or adjusted under 35 U.S.C. 154(b) by 0 days.

(21) Appl. No.: 14/851,922

(22) Filed: Sep. 11, 2015

(65) Prior Publication Data

US 2015/0373958 A1   Dec. 31, 2015

Related U.S. Application Data

(63) Continuation of application No. 14/034,596, filed on Sep. 24, 2013, now abandoned.

(51) Int. Cl.
*A01K 85/01* (2006.01)
*A01K 85/18* (2006.01)

(52) U.S. Cl.
CPC .............. *A01K 85/01* (2013.01); *A01K 85/18* (2013.01)

(58) Field of Classification Search
CPC ........ A01K 85/01; A01K 85/16; A01K 85/18; A01K 97/04; A01K 97/05
USPC .... 43/42.06, 42.32, 42.34, 42.35, 41, 44.99, 43/54.1, 55
IPC ............ A01K 85/01,85/16, 85/18, 97/04, 97/05
See application file for complete search history.

(56) References Cited

U.S. PATENT DOCUMENTS

| | | |
|---|---|---|
| 994,927 A | 6/1911 | Jefferson |
| 2,465,127 A | 3/1949 | Stark |
| 2,546,772 A | 3/1951 | Neff |
| 2,749,647 A | 6/1956 | Beloff |
| 2,769,268 A | 11/1956 | Miller |
| 2,828,571 A | 4/1958 | Caplan |
| 2,839,866 A | 6/1958 | Jay |
| 2,983,065 A | 5/1961 | Ferguson et al. |
| 3,654,724 A | 4/1972 | Charron |
| 3,673,726 A * | 7/1972 | La Montagne ........ A01K 85/00 43/42.11 |
| 3,762,092 A | 10/1973 | Bercz et al. |
| 3,844,060 A | 10/1974 | Kurachi |
| 4,711,595 A | 12/1987 | Magid et al. |
| 4,750,290 A * | 6/1988 | Renaud .................. A01K 85/00 43/42.11 |
| 4,788,788 A | 12/1988 | Brockett |
| 4,839,982 A | 6/1989 | Wood |
| 4,885,867 A | 12/1989 | Leal |
| 4,888,907 A | 12/1989 | Gibbs |
| 4,920,688 A | 5/1990 | Devereaux et al. |
| 4,961,280 A | 10/1990 | Hudson |
| 5,125,182 A | 6/1992 | Holder |
| 5,216,829 A | 6/1993 | Morton |

(Continued)

FOREIGN PATENT DOCUMENTS

GB   566753   1/1945

*Primary Examiner* — Lisa Tsang
(74) *Attorney, Agent, or Firm* — Jansson Munger McKinley & Kirby Ltd.

(57) ABSTRACT

A fishing lure including a head portion and a plurality of flow-through appendage cavity portions which are removably secured to the head portion, each cavity portion including an open front end, a closed tail end, and a substantially rigid sidewall between the front and tail ends, the sidewall having a plurality of sidewall openings disposed to permit flow-through of fluid while preventing pass-through of solids dimensioned greater than the widest sidewall opening.

19 Claims, 5 Drawing Sheets

(56) References Cited

U.S. PATENT DOCUMENTS

| | | | |
|---|---|---|---|
| 5,224,285 | A | 7/1993 | Kamin et al. |
| 5,319,875 | A | 6/1994 | Brandolino |
| 5,870,850 | A | 2/1999 | Gramse, Jr. |
| 6,052,938 | A | 4/2000 | Marusak et al. |
| 6,115,956 | A | 9/2000 | Firmin |
| 6,354,037 | B2 | 3/2002 | Coppola, Jr. |
| D470,909 | S | 2/2003 | Dalpaos |
| 6,588,138 | B1 | 7/2003 | Gilbert |
| 6,658,785 | B1 | 12/2003 | Faulkner et al. |
| 6,871,442 | B2 | 3/2005 | Wyatt |
| 7,146,764 | B1 | 12/2006 | Naumovitz |
| 7,490,432 | B2 | 2/2009 | Gillihan |
| 8,312,669 | B2 | 11/2012 | Thomas |
| 2005/0268525 | A1 | 12/2005 | Kalazich |
| 2006/0143971 | A1 | 7/2006 | Mitchell et al. |
| 2007/0180757 | A1 | 8/2007 | Kalazich |
| 2008/0190010 | A1 | 8/2008 | Neal |
| 2009/0056194 | A1 | 3/2009 | Koskinen |
| 2014/0259866 | A1* | 9/2014 | Jones .................... A01K 85/01 43/42.06 |

\* cited by examiner

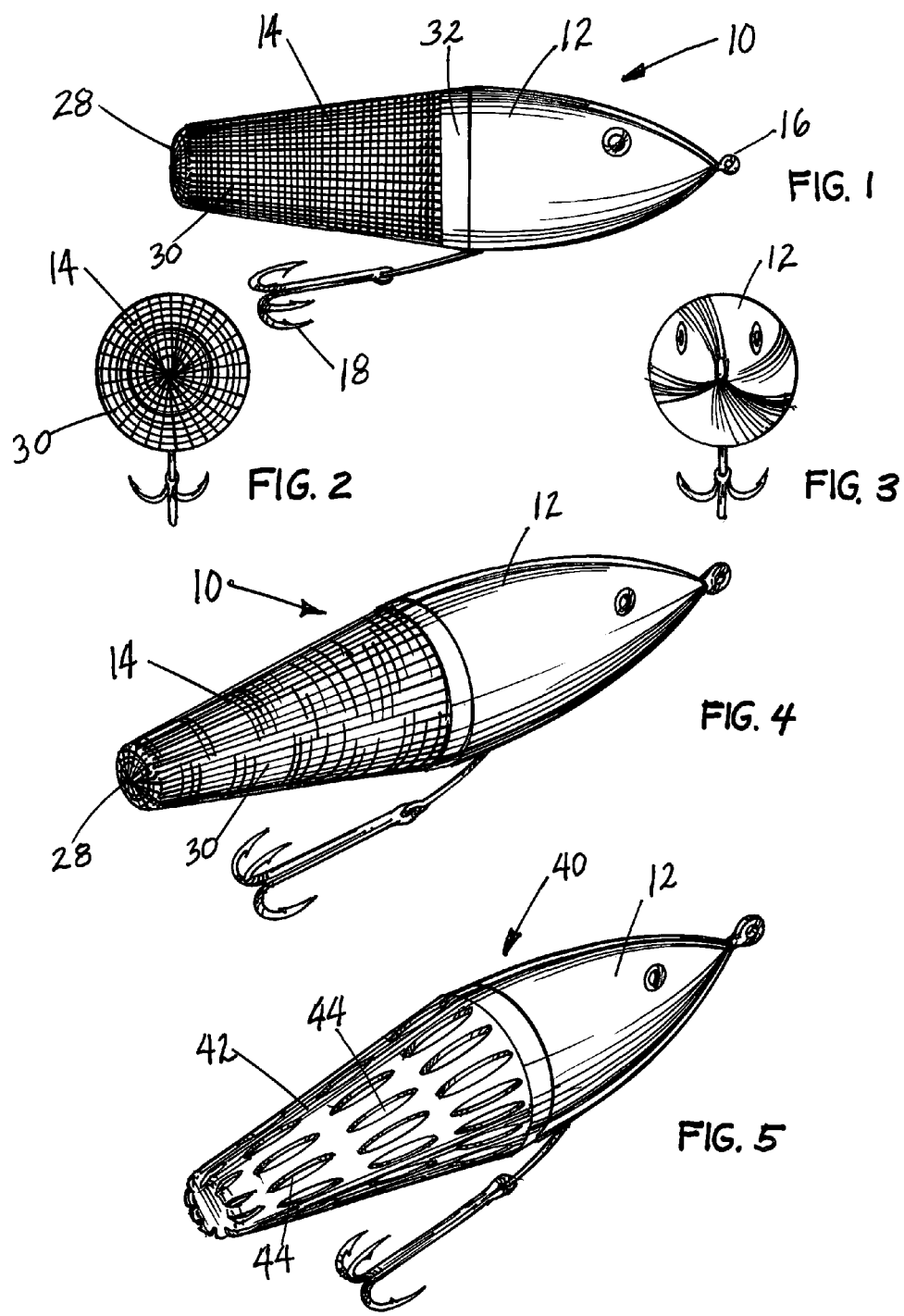

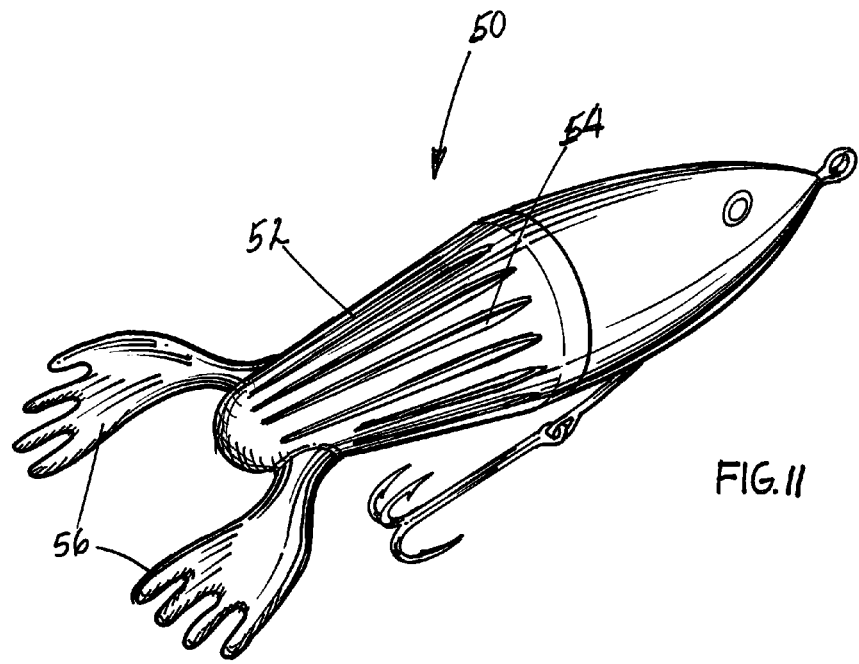
FIG. 11
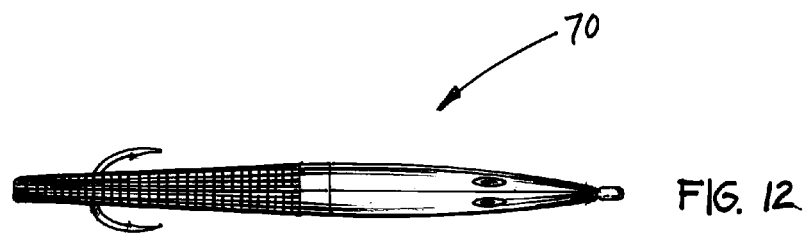
FIG. 12
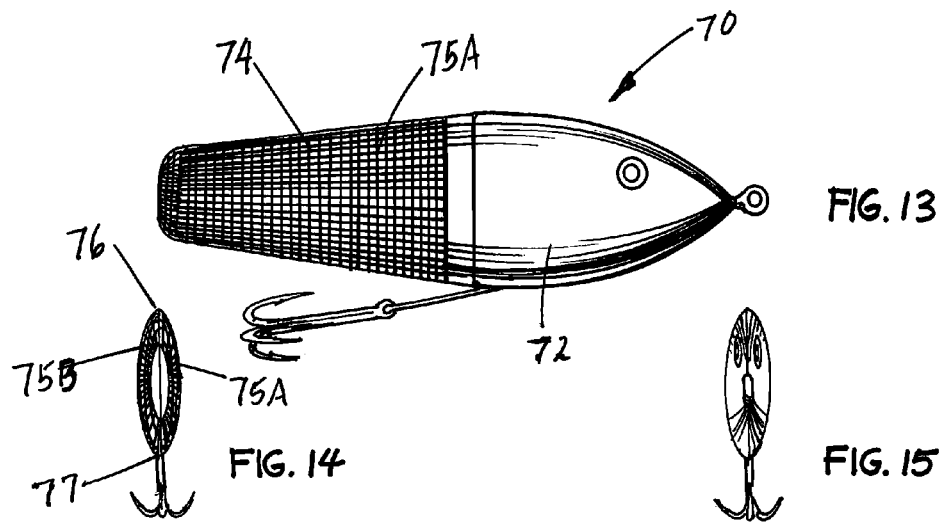
FIG. 13
FIG. 14
FIG. 15

FISHING LURE WITH PLURAL FLOW-THROUGH APPENDAGE CAVITY PORTIONS

RELATED APPLICATIONS

This is a continuation of pending U.S. patent application Ser. No. 14/034,596, filed on Sep. 24, 2013, the contents of which are incorporated by reference in its entirety.

FIELD OF THE INVENTION

This invention relates to sport fishing, and, more specifically, to the field of fishing lures and baits for attaching fish.

BACKGROUND OF THE INVENTION

The challenge of attracting fish with lure and bait goes back millennia and has spawned much invention among fishermen and makers of tackle. For fisherman not content to adorn the end of their line with simple sinker and hook, non-disposable artificial lures of immense variety are known in the art. Most have no provision at all for bait, such as organic or animal matter, and instead depend on visual attractiveness. However, some non-disposable artificial lures have been developed with means for temporary attachment or enclosure of bait, such as animal or other organic matter, which provides non-visual sensory attractiveness to fish. It is improvement in this sort of fishing lure to which the present invention is directed.

The variety of available fishing lures for use at the end of a fishing line has increased with the availability and affordability of modern methods for fabricating and shaping materials—for example, metal and plastic—used in lures. Despite notable creativity in this area in recent decades, room for invention is far from exhausted.

Particular need exists for an attractive non-disposable lure that is capable of securely enclosing bait, large or small, while permitting natural flow of water through the bait-enclosing part of the lure, and wherein the bait-enclosing means provides for quick, simple and clean insertion, enclosure, removal and replacement of bait, facilitating clean and efficient switching of bait by the fisherman without switching lures, and which also serves effectively as a fish-attracting lure even in the absence of any enclosed or attached bait. It is to these several advantages which are the objects of the present invention.

SUMMARY OF THE INVENTION

The fishing lure of this invention includes (1) a head portion and (2) at least one flow-through appendage cavity portion secured to the head portion. More specifically, the head portion has a first securement surface and the cavity portion has a second securement surface, such securement surfaces being configured and dimensioned so that they are engageable with one another to secure the cavity portion to the head portion. If there are more than one cavity portions, each cavity portion has a second securement surface to engage a corresponding first securement surface of the head portion. The fishing lure also has a hook or other fish-catching member; the hook or other fish-catching member is preferably attached to the head portion of the fishing lure, typically in some dangling fashion.

The flow-through appendage cavity portion, or more accurately each flow-through appendage cavity portion, includes: an open front end and at such location its corresponding second securement surface; a closed tail end; and a substantially rigid sidewall between the front end and the tail end, the sidewall including a plurality of sidewall openings disposed to permit flow-through of fluid (water) while preventing pass-through of solids dimensioned greater than the widest sidewall opening. The cavity of the flow-through cavity portion is configured to hold bait inserted therein by the user, such that when the fishing lure is in the water, either still or moving through the water, the fish-attracting constituents of such bait emanate from the fishing lure, by virtue of its flow-though characteristic, and increase the attractiveness of the fishing lure to fish in the area.

In certain preferred embodiments of this invention, the sidewall of the flow-through appendage cavity is of wire mesh and the sidewall openings are apertures defined by intersecting wires of the mesh. Preferably, such sidewall includes many hundreds of sidewall openings, and the sidewall openings are sized to prevent flow-through of animal matter usable as fishing bait. Most preferably, the widest sidewall opening is less than about 2 mm in width.

It is highly preferred that the sidewall of the cavity portion of the inventive fishing lure be hollow and tubular, providing good capacity for bait material. Such sidewall may be of cylindrical, near-cylindrical or truncated conical shape. The cross-sectional shape of the sidewall can be in a smooth circular or other smooth shape.

In certain preferred embodiments, the sidewall of the flow-through cavity portion includes at least one longitudinal crease. Such crease may be formed by the folding of wire mesh material or may be formed by the joining together of free edges of a piece of wire mesh material, for example, such that there are two "creases"—one resulting from folding of wire mesh material and a generally parallel one from the joining of edges. In certain embodiments having at least one sidewall crease, the sidewall includes two opposing interior surfaces that meet at such at least one longitudinal crease and define an angle of 90° or less.

In certain preferred embodiments of the fishing lure of this invention, the head portion includes a marking, coloring or shape feature simulating an eye or other animal head part. This is believed to create visual interest for fish to go along with the non-visual sensory attractiveness provided by the bait or other material contained within the flow-through cavity portion.

In some preferred embodiments, the tail end of the of the cavity portion of the fishing lure also includes a capping element. The capping element is preferably manually removable by the user to open the closed tail end.

In some of such embodiments, at least one of the sidewall and the capping element includes a marking, an applied coloring, an infused coloring or a shape feature simulating an animal body part. This marking, coloring and/or shaping is/are believed, as with respect to markings and features added to the head portion, to create visual interest for fish to go along with the non-visual sensory attractiveness provided by the bait or other material contained within the flow-through cavity portion.

Attachment and detachment of the flow-through cavity portion of the fishing lure from the head portion or, more accurately, opening and closing the cavity of the cavity portion, are preferably facilitated by the nature of the structure. There are various preferred structures for these purposes.

In certain highly preferred embodiments, the flow-through cavity portion is screwably attachable/detachable with respect to the head portion. In such cases, the first and second securement surfaces included corresponding threads.

In another preferred embodiment, the head portion and the cavity portion are attached to each other by a hinge, with one of the first and second securement surfaces of such portions including a latch and the other of the first and second securement surfaces including a latch-catch. The latch and the latch-catch define a point of securement after the cavity portion has bait or other material inserted in it.

In still other preferred embodiments, the first and second securement surfaces of the head portion and cavity portion, respectively, are frictionally engageable. In one highly preferred embodiment, the first and second securement surfaces configured and arranged to be snap-engageable.

As already stated or implied above, some fishing lures in accordance with this invention include a plurality of flow-through appendage cavity portions. In preferred embodiments of such lures, the head portion includes a plurality of securement surfaces for securing the corresponding plurality of cavity portions to the head portion. All cavity portion types, head portion types and cavity-portion-to-head-portion securement means disclosed herein as being included in single-cavity-portion type lures may likewise be included in plural-cavity-portions type lures within the scope of the invention.

Accordingly, for example, in plural-cavity-portions type lures within the scope of this invention, it is preferable for the cavity portions to have mesh-like sidewalls, in some such embodiments each sidewall including hundreds of sidewall openings sized to prevent flow-through of animal matter usable as fishing bait; and in highly preferred embodiments each cavity portion is hollow, tubular and of cylindrical, near-cylindrical or truncated conical shape, and has a widest sidewall opening of less than 2 millimeters in width. In certain preferred embodiments, the tail ends of the cavity portion similarly have openings permitting flow-through of fluid while preventing pass-through of solids dimensioned greater than the widest tail end opening, and in highly-preferred embodiments the widest tail end opening is less than 2 millimeters in width.

The head portion of a plural-cavity-portions type lure within the scope of this invention preferably, but not necessarily, includes a marking, coloring or shape feature simulating an eye or other animal head part. And in some such embodiments the cavity portions also simulate legs, tails or other animal parts.

Cavity-portion-to-head-portion securement means in a plural-cavity-portions type lure within the scope of this invention may include, for example: threads on corresponding securement surfaces for threadable attachment/detachment; latch and latch catch on respective corresponding securement surfaces, where a cavity portion is attached to the head portion by a hinge; or frictional engagement, preferably snap engagement, between corresponding securement surface.

In some plural-cavity-portions type lures within the scope of this invention, the head portion includes a connector aperture, and in certain preferred embodiments the connector aperture is located at the forwardmost point of the head portion, which is beneficial for pulling the lure through water at the end of a fishing line. And in highly preferred embodiments, the head portion also includes a fish-hook securement point located rearward from the connector aperture and a fish-hook member with a proximal end attached to such securement point, the fish-hook member also having a distal end that includes a fish hook. Preferably, the fish-hook securement point and fish-hook member are positioned and configured such that, when the lure is pulled through water, the distal end of the fish-hook member is rearward of the front end of at least one of the cavity portions, so that it will be close by to any bait enclosed within the cavity portion(s).

In the plural-cavity-portions type lures within the scope of the invention, the presence of plural cavity portions affords fishermen novel opportunities to attract fish by using multiple bait types in a single lure that provides for quick, simple and clean insertion, enclosure, removal and replacement of each bait type, and clean and efficient switching thereof. The invention also provides novel opportunities to creatively select combinations of bait types, and to lure fish not merely by a single bait type but by fish-attracting interactions between plural bait types (e.g., interactions of differing smells, differing live-bait movements, and differing sounds, etc.) while avoiding inconveniences of mixing bait or using multiple lures.

BRIEF DESCRIPTION OF THE DRAWINGS

FIG. 1 is a side elevation of a fishing lure in accordance with this invention.

FIG. 2 is a rear elevation of the fishing lure of FIG. 1 or, stated differently, a left side view of the device of FIG. 1.

FIG. 3 is a front elevation of the fishing lure of FIG. 1 or, stated differently, a right side view of the device of FIG. 1.

FIG. 4 is a perspective view of the fishing lure of FIG. 1.

FIG. 5 is a perspective view of an alternative embodiment.

FIG. 11 is a perspective view of another embodiment of the invention.

FIG. 12 is a top plan view of still another fishing lure in accordance with this invention.

FIG. 13 is a front elevation of the fishing lure of FIG. 12.

FIG. 14 is a rear elevation of the fishing lure of FIG. 12 or, stated differently, a left side view of the device of FIG. 13.

FIG. 15 is a front elevation of the fishing lure of FIG. 12 or, stated differently, a right side view of the device of FIG. 13.

DETAILED DESCRIPTION OF PREFERRED EMBODIMENTS

Figure 6:
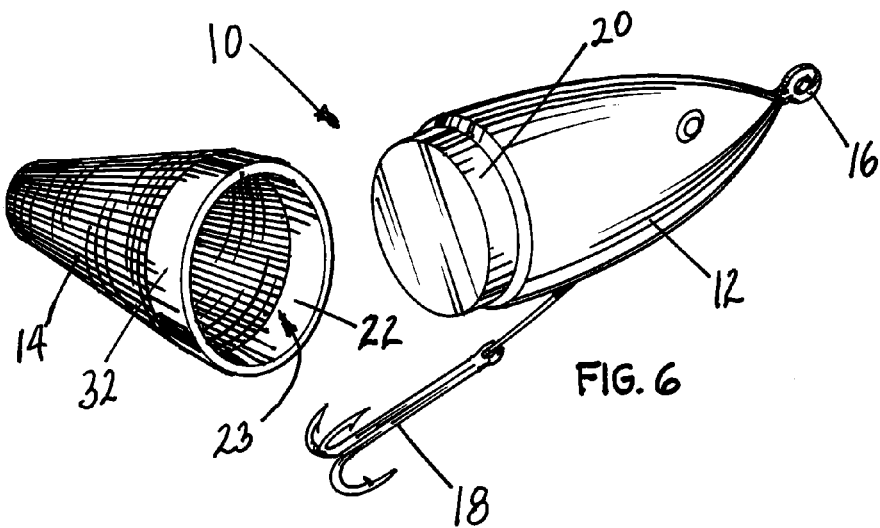
FIGS. 6-8 are perspective views of fishing lures generally like that of FIG. 1, but illustrating different forms to achieve removable engagement of the cavity portion with the head portion, allowing complete disengagement of the cavity portion from the head portion.

The figures illustrate a number of embodiments of the present fishing lure invention. Like numbers are used for parts and portions of the embodiments shown if the parts and portions are substantially similar.

FIGS. 1-4 and 6 illustrate a fishing lure 10. Fishing lure 10 includes a head portion 12 and a flow-through appendage cavity portion 14 secured to the head portion. Head portion 12 has a line-connector eyelet 16 at its front end and a dangling three-prong hook element 18 secured to its side near the rear thereof, so that hook element 18 dangles alongside cavity portion 14 when fishing lure 10 is pulled through the water.

Head portion 12, sometimes referred to herein as first body portion, is not given the name head portion because it may replicate the head of a fanciful creature, although it may be made to appear like a creature's head or to include a creature's head or to include features such as eyes which would be representative of a fanciful creature. In the embodiment illustrated, head portion 12 is the front or lead portion of fishing lure 10 as it is pulled through the water on a line. But other arrangements are also contemplated.

As shown best in FIG. 6, head portion 12 has a first securement surface 20 at its rear end and cavity portion 14 has a second securement surface 22 at its forward end. Second securement surface 22 extends around filling opening 23 of cavity portion 14. First and second securement surfaces 20 and 22 are configured to be tightly frictionally engageable. When disengaged, the cavity formed by cavity portion 14 can be loaded with bait material, whether animal material, other organic material, or any material that would provide non-visual sensory attractiveness by emissions while fishing lure 10 is pulled through the water. When engaged, the loaded material is not only retained, but head portion 12 and cavity portion 14 together from a completed fishing lure body. The frictional engagement of first and second securement surfaces 20 and 22 can be aided in any way desired, including any mechanical means.

Figure 7:
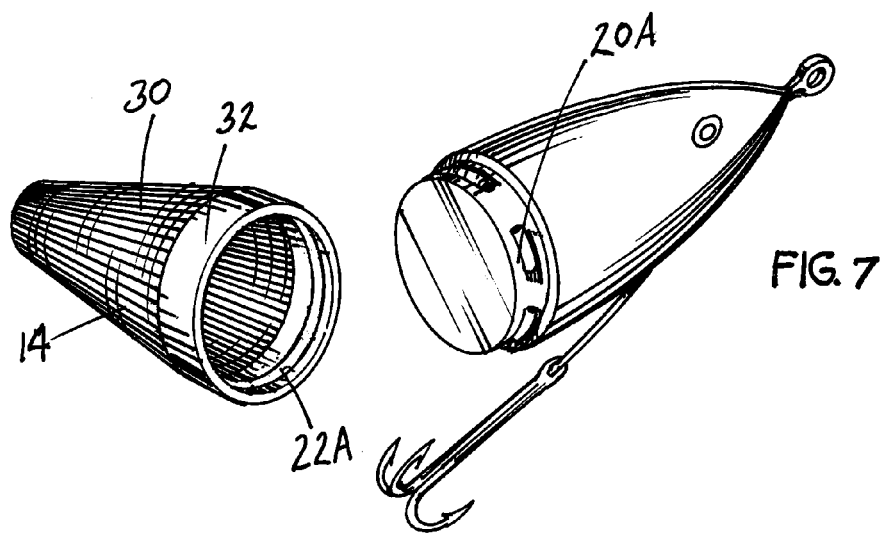
Figure 8:
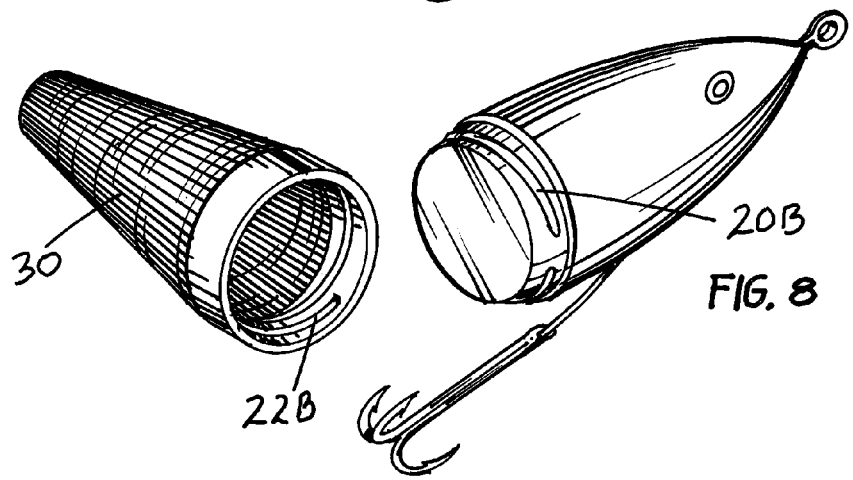
Figure 9:
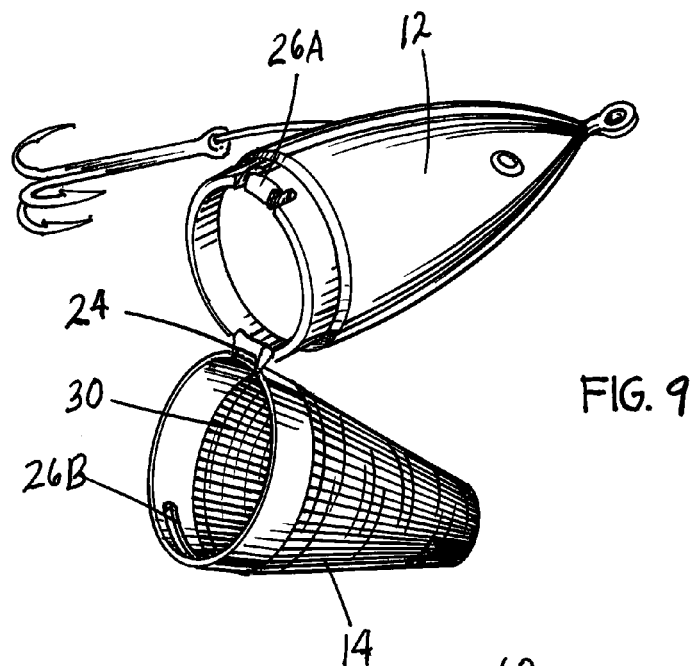
FIG. 9 is a perspective view of an alternative embodiment in which the cavity portion is hinged to the head portion, the fishing lure being shown in the full open position.

FIGS. 7-9 illustrate alternative first and second engagement surfaces for releaseable engagement of cavity portion 14 to head portion 12. FIG. 7 shows snap-engagement surfaces 20A and 22A, while FIG. 8 shows screw engagement surfaces 20B and 22B. FIG. 9 illustrates an embodiment in which the head and the cavity portions are attached to one another by a hinge 24, with the head portion having a latch 26A and the cavity portion having a latch-catch 26B. Latch 26A and latch-catch 26B provide secure closure of cavity portion after bait or other material is inserted into the cavity formed by the cavity portion. Using a hinging device keeps the head and cavity portions together even when the device is opened for loading or unloading purposes.

Flow-through appendage cavity portion 14 also has a closed tail (or rear) end 28. Between tail end 28 and the front end of cavity portion 14 where opening 23 is located, cavity portion 14 has a substantially rigid sidewall 30 extending along the length of cavity portion 14. Sidewall 30, and also rear end 28, are a substantially rigid wire-mesh structure. The term "substantially rigid" as used herein means that the structure has fixed form and shape, rather than being collapsible, such as a bag or the like. Thus, cavity portion 14 together with head portion 12 makes fishing lure 10 to have a defined essentially fixed shape. The wire mesh sidewalls of cavity portion 14 are permanently attached to a rigid band 32 which forms the forwardmost portion of cavity portion 14 and forms second securement surface 22.

The wire mesh structure of fishing lure 10 is perhaps best illustrated in FIGS. 1 and 2, but FIGS. 4 and 6 represent the same wire mesh, as do FIGS. 7-10 and 16 of other embodiments. The embodiment shown in FIGS. 12-15 also utilizes wire mesh for its cavity portion. The wire mesh illustrated for all such embodiments provides a great number of sidewall openings between the intersecting wires of the mesh; these openings, which are less than about 2 mm in width, serve to contain the bait or other inserted material while allowing flow-through of water and outflow of the non-visual attractant emitted from the contained material.

FIG. 5 illustrates a fishing lure 40 which is an alternate embodiment having a cavity portion 42 of rigid plastic, formed by molding or otherwise, metal or other material. Cavity portion 42 has a sidewall with a pattern of elongate flow-through openings 44 formed therein. These are sized to prevent unintentional outflow of bait or other materials inserted into the cavity within cavity portion 42.

FIG. 11 illustrates a fishing lure 50 which is another alternate embodiment of the invention. Fishing lure 50 has a cavity portion 52 of plastic or other material, and has a series of longer sidewall openings 54. Cavity portion 52 of fishing lure 50 also has some frog-feet animal-like features 56 on it to add visual attractiveness. Features 56 may be of the same material as cavity portion 52, and may even be integrally formed with the remainder of cavity portion 52. Alternatively, they can be rubber-like and flexible, which may allow them to wiggle or oscillate in the water while fishing lure 50 is pulled through the water.

Figure 10:
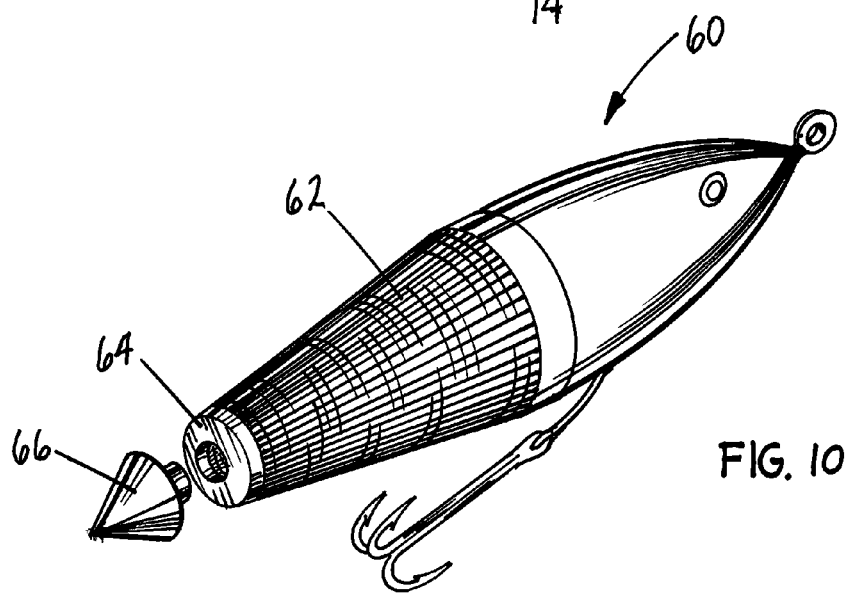
FIG. 10 is a partially exploded perspective view of variation of the fishing lure of this invention which includes a capping element at the rear of the cavity portion of the lure.
Figure 10A:
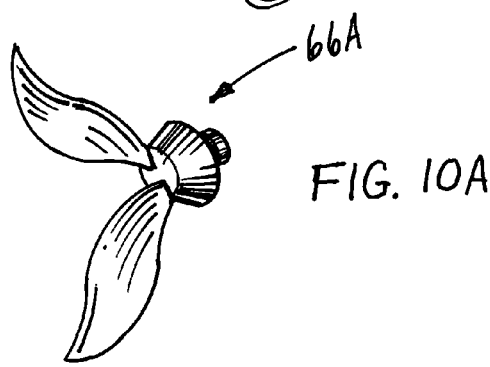
FIG. 10A is a perspective view of another rear capping element.

FIG. 10 illustrates a fishing lure 60 which is yet another embodiment of the invention. Fishing lure 60 has a cavity portion 62 which in all respects is like that of fishing lure 10, except that instead of having wire mesh at its tail end it has a rigid flat cylindrical end member 64 to which a capping member in the form of a conical pointed tailpiece 66 is attached. End member 64 can provide a rear opening or can simply provide a means for attachment of tailpiece 66. FIG. 10A illustrates another capping member, a tailpiece 66A which can be used in place of tailpiece 66. Tailpiece 66A includes flaring wing-like structures which can provide additional visual attractiveness and/or impart a propellor-like spinning motion to fishing lure 60 as it is pulled through the water. These capping members are manually removable and, if end member 64 has an opening therethrough, are additional means to open and close cavity portion 62.

FIGS. 12-15 illustrate still another embodiment of the invention, a fishing lure 70 which has a flatter configuration. More specifically, fishing lure 70 has a head portion 72 and a flow-through appendage cavity member 74 each of which is somewhat flat, such that cross-sections across either portion and at the juncture of such portions are high and narrow.

Cavity member 74 has a sidewall of substantially rigid wire mesh material, as with other embodiments illustrated herein. However, rather than having essentially round cross-sections along the length of the cavity member, the sidewall of cavity member 74 includes opposing sidewall portions 75A and 75B which come together at two longitudinal creases 76 and 77 which are spaced from one another. One of the creases may be created by the folding of the wire mesh material, and the other by the joining together of edges of the wire mesh material. Or, if the wire mesh material is provided in tube form, both creases may be the result of folding. The term "creases" as used herein does not require formation by folding. Sidewall portions 75A and 75B come together at each crease at an angle well under 90°, and sidewall portions 75A and 75B are outwardly bowed when viewed in cross-section, as can be seen best in FIG. 14. The "flatness" of cavity member 74, of course, determines the capacity of the cavity within cavity member 74. The angles between the sidewall portions and the nature of their outward bowing all have an effect on the movement of fishing lure 70 as it moves through the water.

Figure 16:
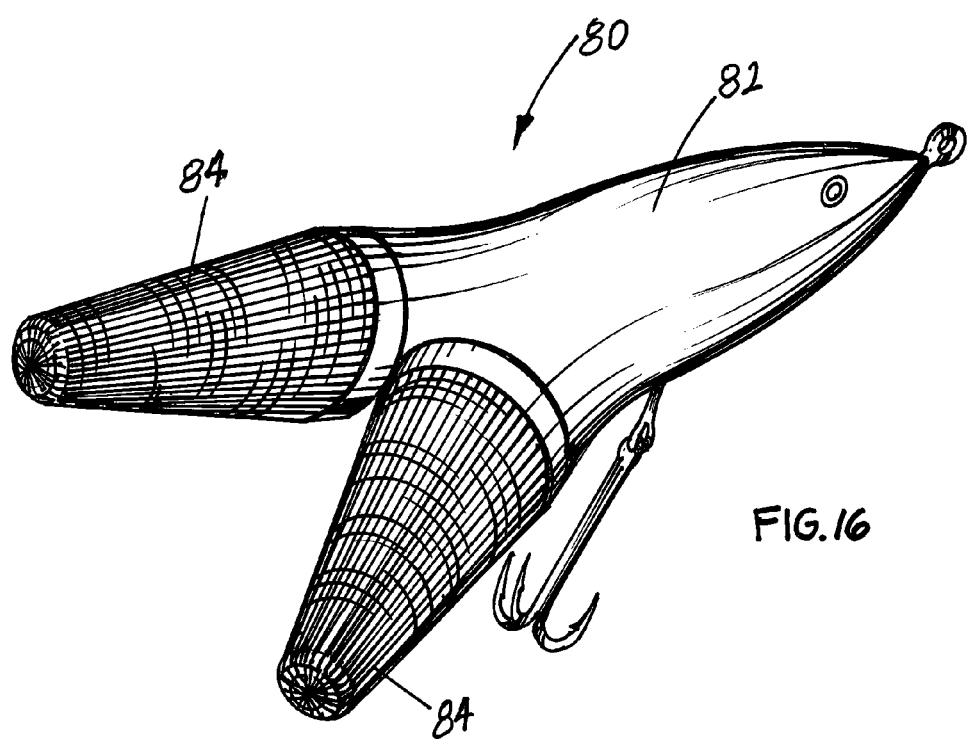
FIG. 16 is a perspective view of yet another fishing lure in accordance with this invention, namely, a fishing lure having two flow-through appendage cavity portions attached to a head portion adapted for such attachment.

FIG. 16 illustrates a fishing lure 80 in accordance with this invention. Fishing lure 80 differs from the other embodiments shown in that it includes a head portion 82 and two flow-through appendage cavity portions 84. Head portion 82 is designed to have two first securement surfaces each of which accommodates one of cavity portions 84. Cavity portions 84 each have a second securement surface configured for attachment to head portion 82 at one of the first securement surfaces.

All portions of the fishing lures of this invention may have shape features simulating animal body parts, applied coloring, markings, or graphic decorations of various kind, as is frequently done with fishing lures. Such features are added to create visual interest for fish to go along with the non-visual sensory attractiveness provided by the bait or other material contained within the flow-through cavity portions.

The fishing lures of this invention may be made with available materials and using known methods.

While the principles of this invention have been described in connection with specific embodiments, it should be understood clearly that these descriptions are made only by way of example and are not intended to limit the scope of the invention.

The invention claimed is:

1. A fishing lure comprising:
    a unitary head portion including a front end, a rear end spaced therefrom and a side therebetween, the side enclosing a space between the front and rear ends; and
    a plurality of flow-through appendage cavity portions, each of which:
        is securable to the unitary head portion in fixed position with respect to each other of the appendage cavity portions and movable between secured and non-secured positions with respect to the unitary head portion,
        forms a separate cavity configured to separately and securely enclose animal matter or other contained solids usable as fishing bait, and
        includes (a) a front end, (b) a tail end, and (c) a substantially rigid sidewall between the front and tail ends, the sidewall including a plurality of sidewall openings disposed and sized to permit flow-through of fluid while preventing pass-through of the animal matter or other contained solids,
    the head portion and the appendage cavity portions being substantially rigid such that the fishing lure has a defined fixed form and shape; and
    a hook element secured to the side of the unitary head portion and dangling alongside the cavity portions, which themselves are free of hooks attached thereto.

2. The fishing lure of claim 1 wherein the head portion includes a plurality of first securement surfaces, and the front end of each of the cavity portions includes a second securement surface engageable with a corresponding first securement surface.

3. The fishing lure of claim 2 wherein the sidewall of each of the cavity portions is of mesh-like material and the sidewall openings are apertures defined by voids in the mesh-like material.

4. The fishing lure of claim 3 wherein the sidewall of each of the cavity portions includes hundreds of the sidewall openings.

5. The fishing lure of claim 2 wherein at least one of the cavity portions is threadably attachable/detachable with respect to the head portion, each of the securement surfaces including threads, the threads of each of the second securement surfaces corresponding to the threads of the corresponding first securement surface.

6. The fishing lure of claim 2 wherein each of the cavity portions is attached to the head portion by a hinge, each of the second securement surfaces including one of a latch or a latch catch and the corresponding first securement surface including the other of a latch or a latch catch, each of the latches and corresponding latch catch defining a point of securement.

7. The fishing lure of claim 2 wherein each of the second securement surfaces is frictionally engageable with the corresponding first securement surface.

8. The fishing lure of claim 2 wherein each of the second securement surfaces is snap engageable with the corresponding first securement surface.

9. The fishing lure of claim 1 wherein sizes of the sidewall openings are such that a widest sidewall opening is less than 2 millimeters in width.

10. The fishing lure of claim 1 wherein the sidewall of each of the cavity portions is tubular.

11. The fishing lure of claim 10 wherein the sidewall of each of the cavity portions is of cylindrical, near-cylindrical or truncated conical shape.

12. The fishing lure of claim 11 wherein the head portion includes a connector aperture.

13. The fishing lure of claim 12 wherein the connector aperture is located at a forwardmost point of the head portion.

14. The fishing lure of claim 13 further comprising:
    a fish-hook securement point located on the head portion rearward from the connector aperture; and
    a fish-hook member having a proximal end attached to the fish-hook securement point and a distal end including a fish hook.

15. The fishing lure of claim 14 wherein the fish-hook securement point and the fish-hook member are positioned and configured such that, when the lure is pulled through water, the distal end of the fish-hook member is rearward of the front end of at least one of the cavity portions.

16. The fishing lure of claim 1 wherein the tail end of each of the cavity portions includes a plurality of tail end openings disposed and sized to permit flow-through of fluid while preventing pass-through of the animal matter or other contained solids usable as fishing bait.

17. The fishing lure of claim 16 wherein sizes of the tail end openings are such that a widest tail end opening is less than 2 millimeters in width.

18. The fishing lure of claim 1 wherein the head portion includes a marking, coloring or shape feature simulating an eye or other animal head part.

19. The fishing lure of claim 18 wherein the cavity portions simulate legs, tails or other animal body parts.

* * * * *